US008560485B2

(12) United States Patent
Labrou et al.

(10) Patent No.: US 8,560,485 B2
(45) Date of Patent: Oct. 15, 2013

(54) GENERATING A DOMAIN CORPUS AND A DICTIONARY FOR AN AUTOMATED ONTOLOGY

(75) Inventors: Yannis Labrou, Washington, DC (US); Stergios Stergiou, Sunnyvale, CA (US)

(73) Assignee: Fujitsu Limited, Kawasaki-shi (JP)

( * ) Notice: Subject to any disclaimer, the term of this patent is extended or adjusted under 35 U.S.C. 154(b) by 837 days.

(21) Appl. No.: 12/711,342

(22) Filed: Feb. 24, 2010

(65) Prior Publication Data

US 2010/0217742 A1    Aug. 26, 2010

Related U.S. Application Data

(60) Provisional application No. 61/155,595, filed on Feb. 26, 2009.

(51) Int. Cl.
*G06N 5/02* (2006.01)
*G06N 5/04* (2006.01)
*G06F 17/30* (2006.01)

(52) U.S. Cl.
USPC ............... 706/50; 706/18; 706/20; 706/55; 707/737

(58) Field of Classification Search
USPC ....................................................... 706/50
See application file for complete search history.

(56) References Cited

U.S. PATENT DOCUMENTS

| 6,009,442 | A | 12/1999 | Chen et al. |
| 6,236,987 | B1 * | 5/2001 | Horowitz et al. ............... 1/1 |
| 6,678,694 | B1 | 1/2004 | Zimmermann et al. |
| 7,213,198 | B1 | 5/2007 | Harik |
| 2005/0065930 | A1 | 3/2005 | Swaminathan et al. |
| 2005/0080781 | A1 | 4/2005 | Ryan et al. |

OTHER PUBLICATIONS

U.S. Appl. No. 12/711,315 entitled "Generating a Dictionary and Determining a Co-Occurrence Context for an Automated Ontology", 27 pages Specification, Claims, and Abstract, 2 pages of Drawings, inventor Yannis Labrou et al., Feb. 24, 2010.
European Patent Office, EPO Form 1507, Communication, European Search Report and Annex to the European Search Report on European Patent Application No. 10154727.1-1527, 6 pages, Jun. 3, 2010.
The State Intellectual Property Office of China, First Notification of Office Action and Text of the First Office Action, Patent Application No. 201010126140.5, Chinese Office Action and English translation, 10 pages, May 31, 2011.
Lancia, Franco, "Word Co-Occurrence and Similarity in Meaning Some Methodological Issues", XP009134447, http://www.mytlab.com/wcsmeaning.pdf, pp. 1-39, 2008.
European Patent Office, Communication, European Search Report on European Patent Application No. 10154726.3-2201, Reference P113503EP00/FWW, 5 pages, Jun. 15, 2010.
Chinese Office Action, Application No. 201010126160.2, with English Translation, 10 pages, Sep. 26, 2011.

* cited by examiner

*Primary Examiner* — Jeffrey A Gaffin
*Assistant Examiner* — Nathan Brown, Jr.
(74) *Attorney, Agent, or Firm* — Baker Botts L.L.P.

(57) ABSTRACT

According to one embodiment, generating a domain corpus includes accessing a knowledge base. The knowledge base comprises a set of articles. Each article corresponds to a particular topic and comprises one or more terms that link to other articles corresponding to other topics. A first set of first articles is selected from the knowledge base for a domain corpus. A second set of second articles related to the first set of first articles is identified. The second set of second articles is selected from the knowledge base for the domain corpus. The domain corpus is made available to access.

15 Claims, 2 Drawing Sheets

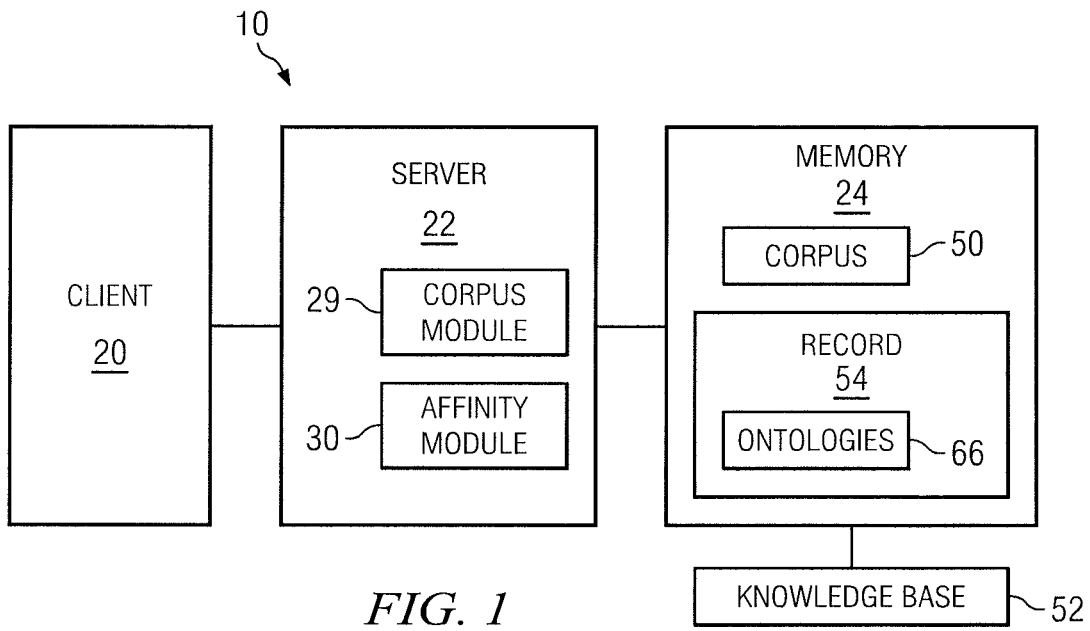
FIG. 1
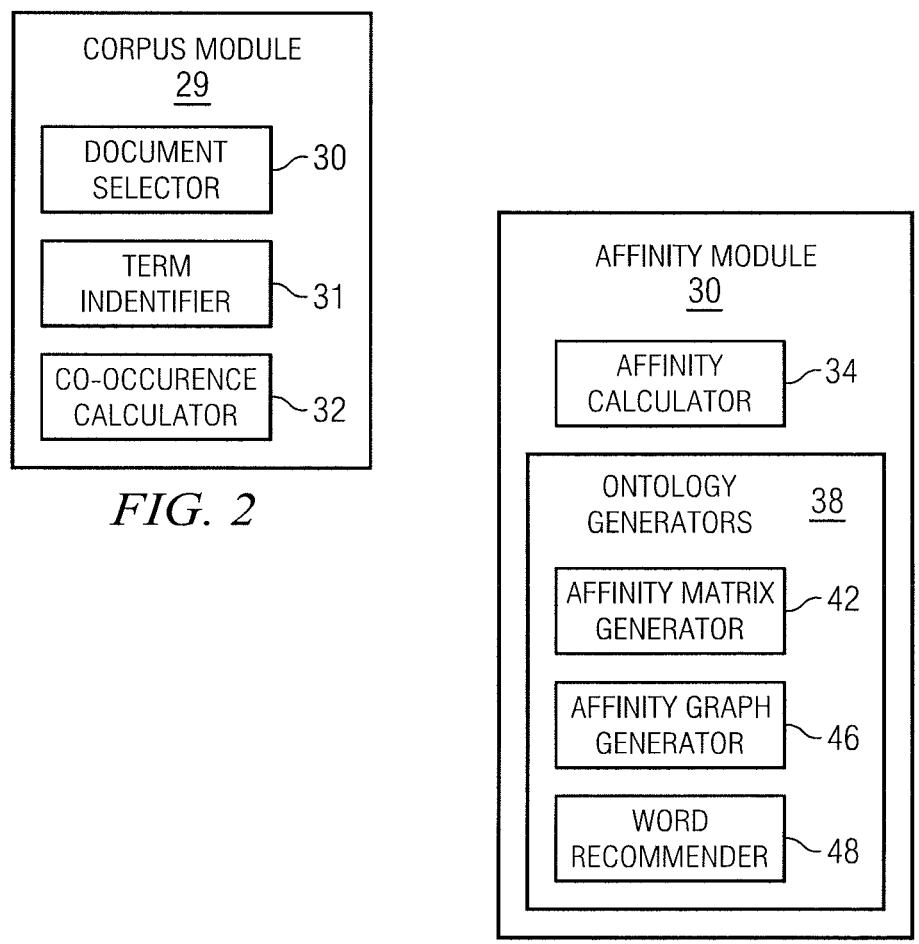
FIG. 2
FIG. 3

US 8,560,485 B2

GENERATING A DOMAIN CORPUS AND A DICTIONARY FOR AN AUTOMATED ONTOLOGY

RELATED APPLICATION

This application claims benefit under 35 U.S.C. §119(e) of U.S. Provisional Application Ser. No. 61/155,595, titled "GENERATING A DOMAIN CORPUS AND A DICTIONARY FOR AN AUTOMATED ONTOLOGY," filed 26 Feb. 2009 by Yannis Labrou et al., which is incorporated herein by reference.

TECHNICAL FIELD

This invention relates generally to the field of lexicographical analysis and more specifically to generating a domain corpus and a dictionary for an automated ontology.

BACKGROUND

A domain corpus may be a collection of documents of a domain. A document may be a collection of terms. A dictionary may include terms of interest of the domain. The terms of interest and domain corpus may be used to identify related terms.

SUMMARY OF THE DISCLOSURE

In accordance with the present invention, disadvantages and problems associated with previous techniques for generating a dictionary and co-occurrence contexts may be reduced or eliminated.

According to one embodiment, generating a domain corpus includes accessing a knowledge base. The knowledge base comprises a set of articles. Each article corresponds to a particular topic and comprises one or more terms that link to other articles corresponding to other topics. A first set of first articles is selected from the knowledge base for a domain corpus. A second set of second articles related to the first set of first articles is identified. The second set of second articles is selected from the knowledge base for the domain corpus. The domain corpus is made available to access.

Certain embodiments of the invention may provide one or more technical advantages. A technical advantage may be that the embodiments work for any suitable language, such as English and other languages. Another technical advantage may be that the embodiments yield a dictionary and co-occurrence contexts. Another technical advantage may be that a corpus may be generated from a knowledge base, such as an online article database.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which:

FIG. 1 illustrates one embodiment of a system 10 that determines the depth of terms and/or documents;

FIG. 2 illustrates one embodiment of a corpus module that may be used with the system of FIG. 1;

FIG. 3 illustrates one embodiment of an affinity module that may be used with the system of FIG. 1;

DETAILED DESCRIPTION OF THE DRAWINGS

Figure 4:
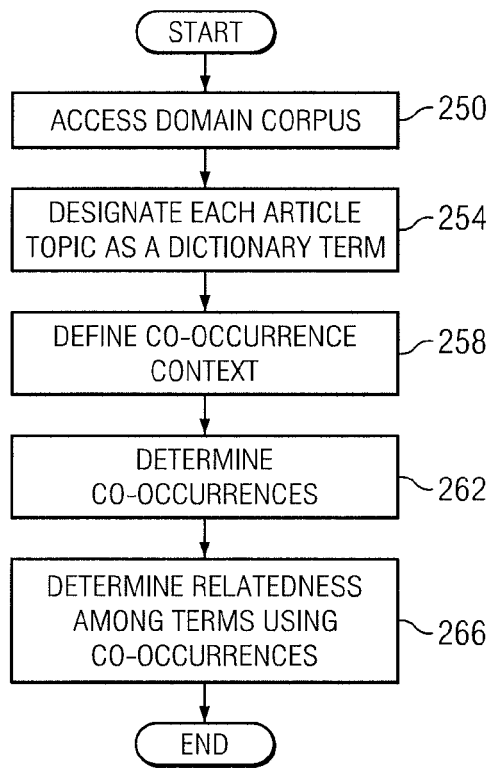
FIG. 4 illustrates an example of a method of identifying terms and determining co-occurrence that may be used with the system of FIG. 1.

Embodiments of the present invention and its advantages are best understood by referring to FIGS. 1 through 5 of the drawings, like numerals being used for like and corresponding parts of the various drawings.

In certain embodiments, a domain ontology may be created and subsequently queried. In certain examples, the process may include the following:

1. Collect documents in a given domain. A domain corpus (or "domain") is a collection of documents. A document is a collection of terms. Examples of a document include a piece of text (e.g., a book of the New Testament), a book, an article, and a set of user-entered tags that individually and/or collectively describe the content of an image.

2. Identify the terms of interest (the dictionary terms) of the domain. A term may be a word (e.g., "tree"), a phrase (e.g., "graph algorithm"), a named entity (e.g., "New York"), etc. A term might not appear verbatim in a document or documents. As a first example, a term could have many forms, e.g., "kidney stones" and "kidney calculi" refer to the same concept, known as "kidney stones" to a layperson and "kidney calculi" to a medical professional. For purposes of creating the ontology, the forms of a term may be treated as mapped to the same term (or concept). As a second example, a stemmed form is the part of the term that is common to its inflected variants. A term in the ontology might be referenced by its stemmed form. For example, the term "trees" stems to the term "tree", thus the term might be "tree" instead of than "trees."

Examples of the methods for identifying the dictionary terms include using a human-generated dictionary for a specific domain (e.g., a medical dictionary of terms for a medical domain) or an automatically generated list of terms based on the set of strings of text in a corpus (e.g., a list generated by indexing the strings in the corpus' documents and then sorting them by frequency and selecting those with frequency above a threshold or similar statistical methods.)

3. For the dictionary terms, calculate the number of co-occurrences of terms in a given co-occurrence context. An example of a co-occurrence context is a document, i.e., two terms co-occur if they each appear at least once within the same document. Another example of co-occurrence context is a paragraph, i.e., two terms co-occur if they each appear at least once within the same paragraph.

4. Create a directed weighted graph with dictionary terms as the nodes and affinities as the weights of the edges. This graph comprises the domain ontology. The term "directed weighted graph" is used conceptually here, since the actual representation of the same information can be done in a variety of data structures, e.g., a matrix, a Binary Decision Diagram.

Any suitable definitions of affinity may be used. Examples include:

a. In certain cases, Basic Affinity between terms A and B is defined as the ratio of the number of co-occurrence contexts that contain both terms A and B over the number of co-occurrence contexts that contain either of the terms A, B:

$$A(A,B) = |AB|/|A \text{ or } B|$$

b. In other cases, Basic Affinity is defined as the ratio of the number of co-occurrence contexts that contain both terms A and B over the maximum of either the number of co-occurrence contexts that contain A or the number of co-occurrence contexts that contain B:

$$A(A,B)=|AB|/\max(|A|,|B|)$$

c. Directional Affinity (DAff) between terms A, B is defined as the conditional probability of observing B given that A was observed within some co-occurrence context (for example, in the same document):

$$DAff(A,B)=|AB|/|A|$$

That is, DAff(A, B) may be the number of co-occurrence contexts that contain both terms A and B, over the number of co-occurrence contexts that contain term A. Generally, Daff (A,B) differs from Daff(B,A).

d. Differential Directional Affinity (DiffDAff) between terms A and B is defined as the directional affinity between terms A and B minus a factor that accounts for the common-ness of the term B in the corpus. The common-ness of the term B in the corpus is generally a statistical value over all the Basic Affinity or Directional Affinity values of the term B towards all other terms in the corpus. One example of the common-ness of the term B in a corpus is the average affinity of term B, yielding following definition of Differential Directional Affinity:

$$DiffDAff(A,B)=DA(A,B)-AA(B)$$

The Average Affinity (AA), or Average Directional Affinity of a term B, is defined as:

$$AA(B)=\text{AVERAGE}\_x\ DAff(x,B)$$

That is, AA(B) may be the average of the Directional Affinities of all other terms over term B in all co-occurrence contexts.

5. Query the graph (ontology). Given one or more dictionary terms as input, the graph may be used to output one or more dictionary terms related to the input terms. In one example, given a term as input, the output is a sorted list of the terms with the highest Differential Directional Affinity towards the input term. In this case, the output terms are more closely related to the input terms, in relation to the domain that the ontology addresses.

FIG. 1 illustrates one embodiment of a system 10 that can generate a domain corpus and/or a dictionary and/or determine co-occurrence contexts for an automated ontology. In certain embodiments, generating a dictionary and determining a co-occurrence context includes accessing a domain corpus comprising articles. Each article corresponds to a particular topic and comprises one or more terms that link to one or more other articles corresponding to one or more other topics. Each topic is designated as a term to yield a dictionary. A co-occurrence context is defined for the domain corpus. At least two terms appearing in the co-occurrence context are considered co-occurring. Co-occurrences among the terms are calculated according to the co-occurrence context.

In certain embodiments, generating a domain corpus includes accessing a knowledge base. The knowledge base comprises a set of articles. Each article corresponds to a particular topic and comprises one or more terms that link to other articles corresponding to other topics. A first set of first articles is selected from the knowledge base for a domain corpus. A second set of second articles related to the first set of first articles is identified. The second set of second articles is selected from the knowledge base for the domain corpus. The domain corpus is made available to access.

In the illustrated embodiment, system 10 includes a client 20, a server 22, and a memory 24. Client 20 allows a user to communicate with server 22 to generate a domain corpus and/or a dictionary and/or determine co-occurrence contexts for an automated ontology. Client 20 may send user input to server 22, and may provide (for example, display or print) server output to user. Server system 24 manages applications for generating ontologies of a language. Memory 24 stores data used by server system 24.

In the illustrated embodiment, memory 24 stores a corpus 50 and a record 54. Corpus 50 may comprise a collection of articles and may be associated with a particular subject matter, community, organization, or other entity. An article (or "page" or "document") may refer to a collection of terms. Examples of an article include one or more pages of a document, one or more documents, one or more books, one or more web pages, correspondence (for example, email or instant messages), and/or other collections of terms. An article may be identified by an article identifier. An article may be electronically stored in one or more tangible computer-readable media. An article may be associated with any suitable content, for example, text (such as characters, words, and/or numbers), images (such as graphics, photographs, or videos), audio (such as recordings or computer-generated sounds), and/or software programs. Articles are also described with respect to knowledge base 52.

Record 54 describes corpus 50. In the embodiment, record 54 ontologies 66. Ontologies 66 represent the terms of a language and the relationships among the terms. In one embodiment, an ontology 66 represents the affinities between terms. In certain embodiments, ontologies 66 include an affinity matrix. As an example, an affinity matrix may record basic affinities or pairwise affinities of terms. As another example, an affinity matrix may record the directional affinities. In the example, the affinity matrix may include A terms represented by rows, and B terms represented by columns. The rows of the matrix record the affinity of a B term given an A term, and the columns of the matrix record the affinity of an A term given a B term. As another example, an affinity matrix may record average affinities.

In certain embodiments, ontologies 66 include an affinity graph. As an example, an affinity graph includes nodes, edges, and links. A node represents a term. The weight of the directed edge between nodes between nodes represents the affinity between the terms represented by nodes. For example, a greater weight represents a greater affinity. A link between the nodes indicates that the affinity between the terms represented by the nodes is above an affinity threshold. The affinity threshold may have any suitable value, for example, greater than or equal to 0.25, 0.5, 0.75, or 095.

Knowledge base 52 represents information in a database from which corpus 50 may be selected. In certain embodiments, knowledge base 52 may comprise a collection of articles. Each article may correspond to a specific topic. In certain embodiments, an article may describe a topic, for example, an encyclopedia article corresponding to topic X may describe topic X. In certain embodiments, an article may be identified by a term, which may be the topic.

In certain embodiments, an article references other articles. For example, an article may include content, which may include linked terms. A linked term may be selected to access, or may have a "link" to, other articles corresponding to the linked terms. For example, an article corresponding to topic X may use a linked term to describe topic X. The linked term may be selected to access another article corresponding to topic Y. A directed link may be a link from an article corresponding to topic X to another article corresponding to topic Y, but not necessarily from the article corresponding to topic Y to the article corresponding to topic X.

In certain embodiments, knowledge base 52 may be an online article database. An online article database comprises computerized articles that may be accessed by a computer over any suitable network, for example, the Internet. Examples of knowledge base 52 include an online encyclopedia (for example, Wikipedia), hypertext encyclopedia (for example, online Britannica, Encarta, etc.), hypertext dictionaries (for example, Wiktionary), and domain specific knowledge bases (for example, Wikinews).

In certain examples, knowledge base 52 and/or domain corpus 50 may comprise Wikipedia articles that describe topic. For example, a Wikipedia article may describe a topic such as Madonna (the entertainer). As another example, a Wikipedia article may describe a topic such as beta hydroxy acid. The beta hydroxy acid article may include content with linked terms such as Beta hydroxy acid, organic compound, carboxylic acid, functional group, hydroxyl, alpha hydroxy acid, salicylic acid, acne, Beta-hydroxybutyric acid, Beta-hydroxy beta-methylbutyrate, Carnitine, and 3-Hydroxypropionic acid.

In the embodiments, a Wikipedia term might have many alias terms associated with it. For example, Wikipedia articles for "Virgin Mary" and "Saint Mary" redirect to Wikipedia article Mary (mother of Jesus). Since the alias terms point to the same article, they need not distinguish them. In the embodiments, the presence of term aliases has no effect in the co-occurrence calculations, i.e., the affinity between a term A and a term B is the same as that of any alias of term A and a term B.

In the illustrated embodiment, server 22 includes a corpus module 29 and an affinity module 30. Corpus module 29 is described in more detail with reference to FIG. 2. Affinity module 30 is described in more detail with reference to FIG. 3.

FIG. 2 illustrates one embodiment of corpus module 29 that may be used with system 10 of FIG. 1. Corpus module 29 may be used to generate corpus 50. In the illustrated embodiment, corpus module 29 includes a document selector 30, a term identifier 31, and a co-occurrence calculator 32. In certain embodiments, document selector 30 selects documents for corpus 50 in any suitable manner. An example of a method of selecting documents is described in more detail with reference to FIG. 5. In certain embodiments, term identifier 31 identifies terms for a dictionary in any suitable manner. An example of a method of identifying terms is described in more detail with reference to FIG. 4. In certain embodiments, co-occurrence calculator 32 determines co-occurrence in any suitable manner. An example of a method of determining co-occurrence is described in more detail with reference to FIG. 4.

In certain embodiments, a domain dictionary may be applied against a second corpus that is different from the corpus 50 from which it was extracted. The second corpus may have different co-occurrence contexts. Domain terms may be mapped to terms in the second corpus to calculate affinity and generate a domain ontology.

FIG. 3 illustrates one embodiment of affinity module 30 that may be used with system 10 of FIG. 1. Affinity module 30 may calculate an affinity for a term pair, record the affinity in an affinity matrix, and/or report the affinity matrix. Affinity module 30 may also generate an affinity graph.

In the illustrated embodiment, affinity module 30 includes an affinity calculator 34, ontology generators 38, and a word recommender 48. Affinity calculator 34 calculates any suitable type of affinity for a term $w_i$ or for a term pair comprising a first term $w_i$ and a second term $w_j$. Examples of affinities include a basic, directional, average, differential, and/or other affinity.

In one embodiment, term recommender 48 receives a seed term and identifies terms that have an affinity with the seed term that is greater than a threshold affinity. The threshold affinity may have any suitable value, such as greater than or equal to 0.25, 0.5, 0.75, or 0.95. The threshold affinity may be pre-programmed or user-designated.

A basic affinity may be calculated from the amount (for example, the number) of pages that include terms $w_i$ and/or $w_j$. The conjunction page amount represents the amount of pages that include both term $w_i$ and term $w_j$, and the disjunction page amount represents the amount of pages that include either term $w_i$ or term $w_j$. The basic affinity may be given by the conjunction page amount divided by the disjunction page amount. In one example, a number of conjunction pages indicates the number of pages comprising term $w_i$ and term $w_j$, and a number of disjunction pages indicates the number of pages comprising either term $w_i$ or term $w_j$. The basic affinity may be given by the number of conjunction pages divided by the number of disjunction pages:

$$\text{Affinity}(w_i, w_j) = P(W_i \& W_j)/P(W_i + W_j)$$

In certain embodiments, an affinity group includes term pairs that have high affinities towards each another, and may be used to capture the relationship between terms $w_1$ and $w_2$ with respect to page content. A high affinity may be designated as an affinity over an affinity group threshold. A threshold may be set at any suitable value, such as greater than or equal to 0.50, 0.60, 0.75, 0.90, or 0.95. A term may belong to more than one affinity group.

A directional affinity may be used to measure the importance of term $w_i$ with respect to term $w_j$. Affinity calculator 34 calculates the directional affinity of term $w_i$ given term $w_j$ from the amount (for example, the number) of pages that include terms $w_i$ and $w_j$. The directional affinity of term $w_i$ given term $w_j$ may be given by the conjunction page amount divided by term $w_j$ page amount. For example, a number of term $w_i$ pages indicates the number of pages that include term $w_i$. The directional affinity of term $w_i$ given term $w_j$ may be given by the number of conjunction pages divided by number of term $w_i$ pages:

$$\text{DAffinity}(w_i, w_j) = P(W_i \& W_j)/P(W_i)$$

DAffinity($w_i$, $w_j$) is not the same as DAffinity($w_i$, $w_j$). A higher directional affinity DAffinity($w_i$, $w_j$) between terms $w_i$ and $w_j$ indicates a higher probability that a page includes term $w_j$ given that the page includes term $w_i$. In one example, pages [1 2 3 4 5 6] include term $w_i$, and pages [4 2] include term $w_j$. The pages that include term $w_j$ also include term $w_i$, so from the viewpoint of term term $w_j$, is of high importance. Only in one-third the pages that include $w_i$ also include term $w_j$, so from the viewpoint of term $w_i$, term $w_j$ is of low importance.

In certain embodiments, the average affinity of a term $w_i$ may be calculated with respect to the other terms $w_j$. In one embodiment, the average affinity may be the average of the affinities between term $w_i$ and every other term $w_j$. The average affinity of term $w_i$ of N terms may be given by:

$$AveAff(w_i) = \frac{1}{N} \sum_{j=1}^{N} P(w_i \mid w_j)$$

In certain embodiments, the average affinity of a term may indicate the depth of the term. A term with a lower average affinity may be regarded as a deeper term, and a term with a higher average affinity may be regarded as a shallower term. Deeper terms tend to be more technical, specific, and precise. A page with a higher percentage of deeper terms may be regarded as a deeper page, and a page with a lower percentage of deeper terms may be regarded as a shallower page. In one embodiment, a user may specify the depth of term and/or pages to be retrieved.

The deeper terms of a page may form one or more clusters of highly related terms. A cluster may represent a common idea, or theme. The number of themes of a page may indicate the specificity of the page. A page with fewer themes may be regarded as more specific, and a page with more themes may be regarded as less specific.

The differential affinity for term $w_i$ with respect to term $w_j$ is the directional affinity between terms $w_i$ and $w_j$ minus the average affinity of term $w_j$ for all other terms. Differential affinity may be expressed as:

$$\text{DiffAff}(w_i, w_j) = \text{DAffinity}(w_i, w_j) - \text{AveAff}(w_j)$$

Differential affinity removes the bias caused by the general tendency for term $w_j$ to occur in pages. In particular circumstances, differential affinity may provide a more accurate indication of the probability that a page includes term $w_i$ given that the page includes term $w_j$.

Differential affinities may be used in a variety of applications. In one example, differential affinities among people's names may be used to study social networking. In another example, differential affinities among language elements may be used to study natural language processing. In another example, differential affinities among products may be used to study marketing.

Affinity calculator 34 may use any suitable technique to search inverted index lists to calculate affinities. For example, to identify pages that include both terms and $w_j$, affinity calculator 34 may search list $W_i$ of term $w_i$ and list $W_j$ of term $w_j$ for common elements, that is, common page identifiers.

In particular embodiments, an ontology generator 38 generates an ontology 66 of a language, such as an affinity matrix or an affinity graph. An ontology may be generated from any suitable affinity, such as a basic, directional, average, differential, and/or other affinity. Ontologies 66 may be generated from terms selected from a language in any suitable manner. For example, terms from a commonly used portion of the language or terms related to one or more particular subject matter areas may be selected.

In the illustrated embodiment, ontology generators 38 include an affinity matrix generator 42 and an affinity graph generator 46. Affinity matrix generator 42 generates an affinity matrix that records affinities between terms. Affinity graph generator 46 generates an affinity graph that represents affinities between terms. In an affinity graph, a node represents a term, and the weight of the directed edge between nodes represents the affinity between the terms represented by the nodes. An affinity graph may have any suitable number of dimensions.

FIG. 4 illustrates an example of a method of identifying terms and determining co-occurrence that may be used with system 10 of FIG. 1. The method starts at step 250, where domain corpus 50 is accessed. An example of a method for selecting corpus 50 is described with reference to FIG. 5. In certain embodiments, domain corpus 50 comprises a set of articles. Each article corresponds to a particular topic. Each article comprises one or more terms that link to other articles corresponding to other topics. In certain examples, domain corpus 50 may comprise Wikipedia articles that describe topics. For example, a Wikipedia article may describe a topic such as Madonna (the entertainer).

Each article topic is designated as a dictionary term at step 254 to yield a dictionary. For example, Wikipedia article topic Madonna (the entertainer) is designated as a dictionary term.

A co-occurrence context is defined at step 258. The co-occurrence context is an amount of text used to determine if terms co-occur: If terms appear in the same co-occurrence context, they co-occur. In certain embodiments, a co-occurrence context may be defined as an article, such that if a first term and a second term are in the same article, the first term and the second term are co-occurring. In certain embodiments, a co-occurrence context may be defined as a subset of an article, such that if a first term and a second term are in the same subset of an article, the first term and the second term are co-occurring. Examples of subsets of an article include one or more sections or subsections.

In certain embodiments, a co-occurrence context of an article may be defined according to a minimum number of terms of a co-occurrence context and a maximum number of terms of a co-occurrence context. In the embodiments, if the article has no sections, the co-occurrence context is the article. If an article has sections and if the number of terms of a section are above a minimum number of terms, then the section is a co-occurrence context. Otherwise, the section is merged into a single co-occurrence context with a subsequent or previous section and the threshold test is applied again. If the number of terms in a section is above a maximum number of terms, subsections are tested according to the minimum number of terms. The minimum number of terms may be in a range of less than 5, 5 to 10, or 10 to 20, and the maximum number of terms may be in a range of 25 to 30, 30 to 40, or greater than 40. The article title may be included in a co-occurrence context and may or may not be counted for purposes of the minimum and maximum values.

Co-occurrences are determined according to the co-occurrence context at step 262. Terms that appear in a co-occurrence context are co-occurring. Relatedness among terms is determined from the co-occurrences at step 266. In certain embodiments, affinities (such as directed affinities) among the terms may be calculated according to the co-occurrences. In certain embodiments, an affinity graph (such as a directed weighted affinity graph) can be constructed from the affinities and queried. In certain embodiments, an input term may be received. One or more terms of the domain corpus that are related to the input term may be determined according to the affinity graph.

Figure 5:
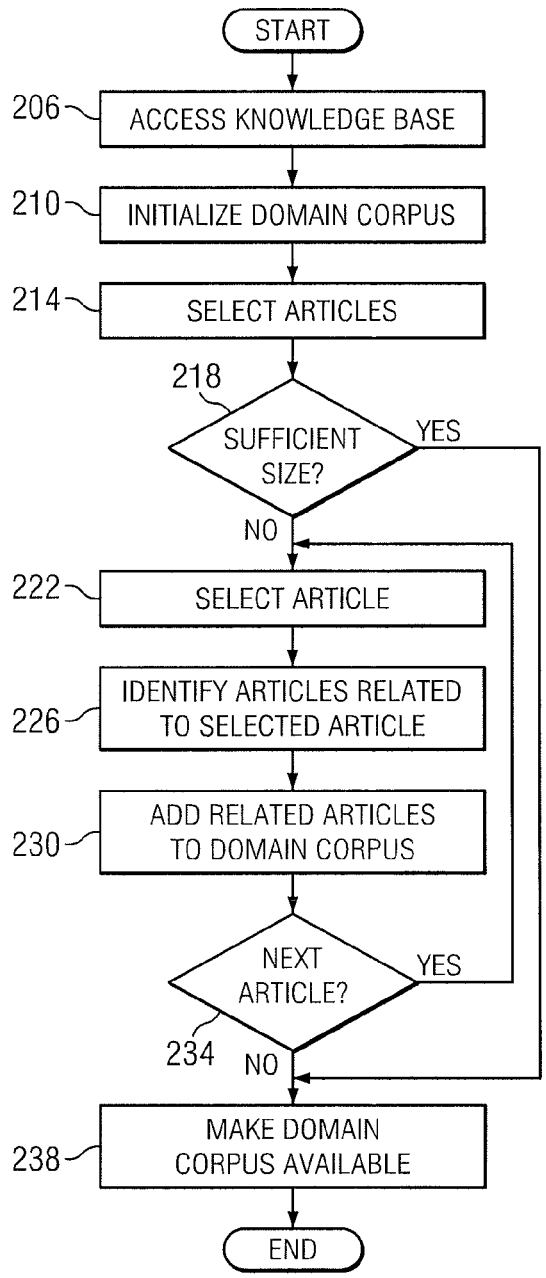
FIG. 5 illustrates an example of a method of selecting documents that may be used with the system of FIG. 1.

FIG. 5 illustrates an example of a method of selecting documents that may be used with system 10 of FIG. 1. The method starts at step 206, where knowledge base 52 is accessed. Knowledge base 52 comprises a set of articles. Each article corresponds to a particular topic and comprises one or more terms that link to other articles corresponding to other topics. In certain embodiments, knowledge base 52 comprises an online article database, such as Wikipedia, that comprises articles A.

Domain corpus 50 is initialized at step 210. In certain embodiments, the domain corpus 50 may be initialized as empty. A first set of first articles is selected from knowledge base 52 for domain corpus 50 at step 214. The first set may be selected in any suitable manner, such as one or more of the following. In certain embodiments, a selection of one or more articles may be received from a user. The selected articles may be designated as one or more first articles of the first set. In certain embodiments, one or more articles of a category of knowledge base 52 (such as a Wikipedia category or content portal) may be designated as one or more first articles of the first set. As an example, if the domain is "energy," articles from the "energy" category may be selected for the first set. As another example, if the domain is "automotive technologies," articles from the "automotive technologies" content portal may be selected for the first set.

The first set may or may not be a sufficient size at step 218. A size may be sufficient according to the application of corpus 50, and may be any suitable number, such as a number in the range of less then 1,000, 1,000 to 10,000, 10,000 to 50,000, or greater than 50,000. If the first set is a sufficient size, the method proceeds to step 238. If the first set is not a sufficient size, the method proceeds to step 222.

Steps 222 through 234 describe examples of methods to identify a second set of second articles related to the first set of first articles and selecting the second set of second articles from the knowledge base for the domain corpus. An article is selected at step 222.

Articles related to the selected article are identified at step 226. Related articles may be identified in any suitable manner, for example, using one or more of the following methods. In certain embodiments, an affinity graph of the first articles may be generated. The affinity graph comprises one or more nodes, each representing a term corresponding to an article. A root node represents the term corresponding to the root article, for examples, the article for which the affinity graph is being generated. A child node represents a linked term that appears in the root article, and that linked term links to a child article. A grandchild node represents a linked term that appears in a child article, and that linked term links to a grandchild article. One or more articles related to the each first article may be identified according to the affinity graph. The related articles may be placed in the second set.

For example, a graph may include the child nodes and grandchild nodes of $A_i$ and directed links among the nodes. A child node of a node A represents a linked term B that appears in the article for A and a grandchild of A represents a linked term C that appears in the article for B. Child nodes and grandchild nodes of may be added to Related($A_i$), the set of nodes related to $A_i$, if one or more of the following holds:
- a child of $A_i$ has a directed link to $A_i$;
- a child of $A_i$ has more than a predetermined number of directed links to other children of $A_i$ or to a predetermined percentage of all children of $A_i$;
- a grandchild of $A_i$ has a link to $A_i$; and/or
- a grandchild of $A_i$ has more than a predetermined number of directed links to other children of $A_i$ or to a predetermined percentage of all children of $A_i$.

The predetermined number and the predetermined percentage may have any suitable values. For example, the predetermined number may have a value in the range of less then 3, 3 to 5, 5 to 10, or 10 to 25. The predetermined percentage may have a value in the range of less then 5%, 5% to 10%, 10% to 25%, or 25% to 50%.

In certain embodiments, an affinity graph of the first articles may be generated. The affinity graph may be weighted in any suitable manner. One or more articles related to the each first article may be identified according to the weighted affinity graph. The related articles may be placed in the second set.

The links may be assigned weights in any suitable manner. For example, an affinity graph may be calculated as described above. Higher weights may be assigned to links closer to the root node. For example, weights between the root and child nodes may be higher than weights between the child and grandchild nodes. For example, the following weights may be assigned, where $w_1 > w_2 > w_3$:

root→child: $w_1$
child→root: $w_1$
child→child: $w_2$
root→grandchild: $w_2$
child→grandchild: $w_2$
grandchild→child: $w_3$
grandchild→grandchild: $w_3$ The weights may have any suitable value, such as $w_1=1$, $w_2=0.5$, and $w_3=0.25$.

A value may be calculated for each node of the graph in any suitable manner. For example, the value may be calculated from a mathematical function (such as the sum function) applied to one, more, or all incoming and/or outgoing links connected the node. Related nodes may be selected in any suitable manner. Nodes with values greater than a predetermined value and/or a predetermined percentage of the nodes with the highest values may be selected. The predetermined value and the predetermined percentage may have any suitable value. For example, given the weights above, the predetermined value may have a value in the range of 1 to 3, 3 to 5, 5 to 10, or greater than 10. The predetermined percentage may have a value in the range of 3% to 10%, 10% to 25%, or greater than 50%.

As another example, an affinity graph may be calculated as described herein. The links to a node may be weighted according to the popularity of the article corresponding to the term represented by the node. The popularity of an article may be measured according to the number of times the article has been accessed by users. A higher number of times indicates a more popular article. The number of times the article has been accessed may be given by a PageRank or HITS of the article.

A value may be calculated for each node of the graph in any suitable manner, such as in a manner described herein. Related nodes may be selected in any suitable manner, such as in a manner described herein. The predetermined value and the predetermined percentage may have any suitable value. For example, given the weights above, the predetermined value may have a value in the range of 0.25x to 0.5x, 0.5x to 1x, or greater than 1x, where x represents the average node value. The predetermined percentage may have a value in the range of 3% to 10%, 10% to 25%, or greater than 50%.

As another example, an affinity graph may be calculated as described herein. Related articles may be selected according to a Taggr technique. An example of a Taggr technique is described in U.S. patent application Ser. No. 12/368,689, titled "Determining Words Related to a Given Set of Words," filed 10 Feb. 2009, by Yannis Labrou et al., which is incorporated herein by reference.

In certain embodiments, the Taggr technique involves selecting one or more temporary articles from knowledge base 52 for each first article, the temporary articles having a higher affinity (such as differential affinity) to each first article according to an affinity graph. An average affinity may be calculated for each temporary article. The average affinity represents an average of affinities from each temporary article to every first article of the first set. In certain examples, the average affinity of a node may be the average of at least two or all the weights of the incoming links to the node. One or more temporary articles may be removed, each with an average differential affinity that fails to satisfy a predetermined threshold. The remaining temporary articles may be placed into the second set.

In an example, the following parameters are use:
k1: upper bound on the number of candidate terms that a term can suggest;
k2: average differential affinity threshold;
k3: upper bound on the number of the results per iteration;

k4: upper bound on the number of iterations; and k5: upper bound on the number of the returned results.

Example ranges for the parameters are [5, 20] for k1, [−0.1, 0.1] for k2, [5, 20] for k3, [1, 3] for k4, and [5, 20] for k5.

In the example, an initial set of terms may be received. A set Q of candidate terms to be obtained from set S may be initialized. Initially, set Q may be equal to set S. At most, k1 terms with the highest differential affinity are collected for each term of set Q, and are placed in a temporary set R along with their differential affinities. That is, each term of set Q yields at most k1 terms that have the highest differential affinity to an originating term of the set. If the same term is obtained from multiple terms of set Q, then the differential affinity for the term is the sum of the respective differential affinities.

For each term of set R, the average of the differential affinities from the term to every term of set S, the "average differential affinity" for the term, is calculated. Terms with average differential affinities below an average differential affinity threshold k2 are removed from set R. The k3 terms of set R with the highest differential affinities are added to set Q. The steps may be repeated k4 times.

After k4 iterations, the terms of set Q are sorted. The terms may be sorted based on, for example, their average affinity or the average of their differential affinity towards the other terms of set Q such that the terms with higher average affinities or higher average differential affinities are at the top of the list. The top k5 terms of set Q are related.

Related articles are added to corpus 50 at step 230. There may be a next first article of the first set that has not been selected at step 234. If there is a next article, the method returns to step 222 to select the article. If there is no next article, the method proceeds to step 238.

Domain corpus 50 is made available at step 238. Domain corpus 50 may be made available in any suitable manner. For example, corpus 50 may be made accessible to users, such that users can use and search corpus 50. The method then ends.

In certain embodiments, the entire or only a portion of selected articles may be added to domain corpus 50. For example, articles may include sections of a specific type, such as "History," "How to . . . ," or "Economy," etc. Sections of a specific type may be added to create a corpus 50 of a particular domain, such as a "How to" domain.

In certain situations, domain corpus 50 may include superfluous articles with superfluous terms. If most articles of domain corpus 50 belong in the intended domain, the affinities of superfluous terms are lower than those of the more domain-relevant terms.

In certain embodiments, a domain-specific dictionary and a broader (not necessarily domain-specific) corpus may be used to calculate a directed weighted graph. In the embodiments, the dictionary is the set of terms of domain corpus 50, but affinities for the terms are calculated based on co-occurrence contexts of articles inside and outside of the domain. In the embodiments, domain corpus 50 may be a proper subset of or may significantly overlap knowledge base 52 from which domain corpus 50 is extracted.

Modifications, additions, or omissions may be made to the systems and apparatuses disclosed herein without departing from the scope of the invention. The components of the systems and apparatuses may be integrated or separated. Moreover, the operations of the system and apparatuses may be performed by more, fewer, or other components. For example, the operations of corpus module 29 and affinity module 30 may be performed by one component, or the operations of corpus module 29 may be performed by more than one component. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The method may include more, fewer, or other steps. Additionally, steps may be performed in any suitable order.

A component of the systems and apparatuses may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A computer-implemented method comprising:

accessing a knowledge base, the knowledge base comprising a set of articles, each article corresponding to a particular topic, each article comprising one or more terms that link to other articles corresponding to other topics;

selecting a first set of first articles from the knowledge base for a domain corpus;

identifying a second set of second articles related to the first set of first articles, the identifying the second set of second articles comprising performing the following on the first set:

generating an affinity graph of the first set;

identifying one or more articles related to a first article according to the affinity graph; and placing the related articles in the second set;

selecting the second set of second articles from the knowledge base for the domain corpus; and making the domain corpus available to access.

2. The method of claim 1, the affinity graph comprising a first node and a second node, the first node comprising a child node of the second node if there is a threshold affinity from the second node to the first node.

3. The method of claim 1, the identifying the second set of second articles further comprising:

selecting one or more temporary articles from the knowledge base for each first article, the temporary articles having a higher affinity to the each first article according to an affinity graph;

calculating an average affinity for each temporary article, the average affinity representing an average of affinities from the each temporary article to every first article of the first set;

removing one or more temporary articles, each with an average affinity that fails to satisfy a predetermined threshold; and placing the remaining temporary articles into the second set.

4. The method of claim 1, further comprising:

receiving a selection of one or more articles from a user; and designating the selected articles as one or more first articles of the first set.

5. The method of claim 1, further comprising:

designating one or more articles of a category of the knowledge base as one or more first articles of the first set.

6. The method of claim 1, the knowledge base comprising an online article database.

7. A tangible computer-readable medium comprising code that when executed by a processor is operable to:

access a knowledge base, the knowledge base comprising a set of articles, each article corresponding to a particular topic, each article comprising one or more terms that link to other articles corresponding to other topics;

select a first set of first articles from the knowledge base for a domain corpus;

identify a second set of second articles related to the first set of first articles, the identifying the second set of second articles comprising performing the following on the first set:

generating an affinity graph of the first set;

identifying one or more articles related to a first article according to the affinity graph; and placing the related articles in the second set;

select the second set of second articles from the knowledge base for the domain corpus; and make the domain corpus available to access.

8. The computer-readable medium of claim 7, the affinity graph comprising a first node and a second node, the first node comprising a child node of the second node if there is a threshold affinity from the second node to the first node.

9. The computer-readable medium of claim 7, the code operable to identify the second set of second articles by:

selecting one or more temporary articles from the knowledge base for each first article, the temporary articles having a higher affinity to the each first article according to an affinity graph;

calculating an average affinity for each temporary article, the average affinity representing an average of affinities from the each temporary article to every first article of the first set;

removing one or more temporary articles, each with an average affinity that fails to satisfy a predetermined threshold; and placing the remaining temporary articles into the second set.

10. The computer-readable medium of claim 7, the code operable to:

receive a selection of one or more articles from a user; and designate the selected articles as one or more first articles of the first set.

11. The computer-readable medium of claim 7, the code operable to:

designate one or more articles of a category of the knowledge base as one or more first articles of the first set.

12. The computer-readable medium of claim 7, the knowledge base comprising an online article database.

13. A system comprising:

an interface operable to access a knowledge base, the knowledge base comprising a set of articles, each article corresponding to a particular topic, each article comprising one or more terms that link to other articles corresponding to other topics; and one or more processors operable to:

select a first set of first articles from the knowledge base for a domain corpus;

identify a second set of second articles related to the first set of first articles, the identifying the second set of second articles comprising performing the following on the first set:

generating an affinity graph of the first set;

identifying one or more articles related to a first article according to the affinity graph; and placing the related articles in the second set;

select the second set of second articles from the knowledge base for the domain corpus; and make the domain corpus available to access.

14. The system of claim 13, the affinity graph comprising a first node and a second node, the first node comprising a child node of the second node if there is a threshold affinity from the second node to the first node.

15. The system of claim 13, the one or more processors operable to identify the second set of second articles by:

selecting one or more temporary articles from the knowledge base for each first article, the temporary articles having a higher affinity to the each first article according to an affinity graph;

calculating an average affinity for each temporary article, the average affinity representing an average of affinities from the each temporary article to every first article of the first set;

removing one or more temporary articles, each with an average affinity that fails to satisfy a predetermined threshold; and placing the remaining temporary articles into the second set.

* * * * *